US008676669B1

(12) United States Patent
Chittoor et al.

(10) Patent No.: US 8,676,669 B1
(45) Date of Patent: Mar. 18, 2014

(54) PROVIDING CONFIRMATIONS FOR LIST MODIFICATIONS

(75) Inventors: Arjun Chittoor, Redmond, WA (US); Aaron M. Donsbach, Seattle, WA (US); Kenneth James Price, Seattle, WA (US); Jeffrey T. Brownell, Beaverton, OR (US); Homer G. Morgan, III, Seattle, WA (US); Brent Russell Smith, Redmond, WA (US); Michael D. McDaniel, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 782 days.

(21) Appl. No.: 12/732,315

(22) Filed: Mar. 26, 2010

(51) Int. Cl.
*G06Q 30/00* (2012.01)
(52) U.S. Cl.
USPC ..... 705/27.1; 705/26.1; 705/26.8; 705/26.81; 705/26.82
(58) Field of Classification Search
USPC .................................. 705/26.1–27.2
See application file for complete search history.

(56) References Cited

U.S. PATENT DOCUMENTS 5,956,709 A * 9/1999 Xue ............................ 705/26.1
6,636,863 B1 * 10/2003 Friesen ............................ 1/1
2009/0048939 A1 * 2/2009 Williams ........................ 705/26
2010/0063868 A1 * 3/2010 Bird et al. ........................ 705/10
2011/0238524 A1 * 9/2011 Green et al. ................. 705/26.7

OTHER PUBLICATIONS

"XML-based e-commerce shopping cart application" Ilapogu, Dinaker Rajesh. University of Louisville, ProQuest, UMI Dissertations Publishing, 2002. Retrieved via ProQuest.*
"iPod + MP3 Players : Electronics : Target" last accessed Mar. 24, 2010 (2 pages) http://www.target.com/iPod-MP3-Players-Audio-Electronics/b/ref=nav_t_spc_13_9/186-5386859-3478856?ie=UTF8&node=3429461.
"More like Stargate: The Ark of Truth : Netflix" last accessed Feb. 19, 2010 (1 page) http://www.netflix.com/WiMovie/Stargate_The_Ark_of_Truth/70086230?trkid=1287856.

* cited by examiner

*Primary Examiner* — Michael Misiaszek
(74) *Attorney, Agent, or Firm* — Thomas | Horstemeyer, LLP

(57) ABSTRACT

Disclosed are various embodiments for providing confirmations for list modifications. A network page is sent to a client. The network page includes one or more components for requesting that one or more items be added to a list of items. The item(s) are added to the list of items in response to a request from the client. A display region is encoded for rendering in the client as a layer superimposed on the network page. The display region includes a confirmation that the item(s) have been added to the list of items. The display region includes one or more undo components for requesting that a last modification to the list of items be reversed.

28 Claims, 11 Drawing Sheets

PROVIDING CONFIRMATIONS FOR LIST MODIFICATIONS

BACKGROUND

When a customer of an online retailer adds a product to a shopping cart on a network site, the customer is typically presented with a network page showing the contents of the shopping cart. Such a network page may display, for example, quantities of each product in the shopping cart, price subtotals, shipping quotations, and other information related to the shopping cart. Accordingly, the customer may decide whether to proceed with placing an order for the products listed in the shopping cart. Some customers change their minds and decide to abandon their shopping cart after viewing the network page. Other customers decide to change quantities of products within the shopping cart after viewing the network page.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing confirmations to users when lists of items are modified. When a user, for example, adds an item to a list of items, the user may be presented with a network page showing a confirmation that the addition to the list of items has been processed. The network page may, in some embodiments, include the list of items itself as well as tools for modifying the list of items. Rather than directing the user to a different network page, various embodiments of the present disclosure render such a confirmation within a display region superimposed on the network page from which the user initiated the modification of the list of items. Such an arrangement makes it easier for the user to return to that network page and continue shopping through the network site. In the following discussion, a general description of the system and its components is provided, followed by a discussion of the operation of the same.

Figure 1:
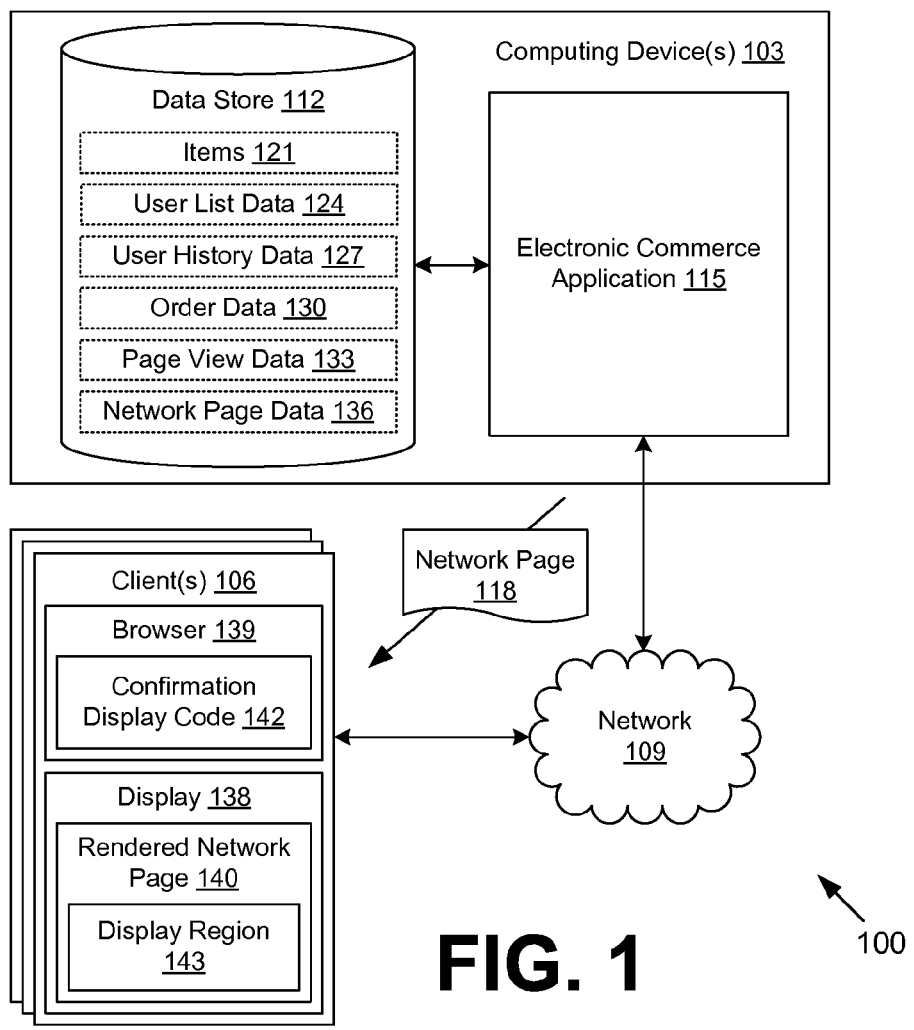
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce application 115, and other applications, services, processes, systems, engines, or functionality not discussed in detail herein. The electronic commerce application 115 is executed to facilitate the online purchase of items over the network 109. The electronic commerce application 115 also performs various back-end functions associated with the online presence of a merchant in order to facilitate the online purchase of items as will be described. For example, the electronic commerce application 115 generates network pages 118 such as web pages or other types of network content that are provided to clients 106 for the purposes of selecting items for purchase, rental, download, lease, or other form of consumption as will be described.

The data stored in the data store 112 includes, for example, items 121, user list data 124, user history data 127, order data 130, page view data 133, network page data 136, and potentially other data. The items 121 include data relating to items offered for order by the electronic commerce application 115. As used herein, the term "item" refers to any product, good, service, download, media feature, and/or any other item 121 that may be offered for sale, rental, or download by an online retailer. The data describing the items 121 may include, for example, titles, descriptions, quantities, prices, weights, reviews, ratings, related items 121, relevant keywords, and/or any other data that may be used to describe the items 121.

The user list data 124 includes data that describes lists of items 121 which have been created by users. To this end, the user list data 124 may include references to various items 121 selected by or for the user, quantities of the respective items 121, options and other attributes associated with the respective items 121, and/or other information. In one embodiment, there may be multiple lists of items 121 for each user within the user list data 124. Such lists of items 121 may include shopping carts, shopping lists, purchase lists, gift registries, wish lists, and/or any other type of list of items 121. The user history data 127 may describe previous selections of items 121 by respective users. Such item 121 selections may include orders of the respective items 121, views of network pages 118 associated with the items 121, and/or any other type of selection of an item 121 that can be correlated to a user.

The order data 130 describes past orders that have been placed by customers of the network site. The page view data 133 includes data describing previous views of network pages 118 by various users. The page view data 133 may be determined through, for example, logs of a network page server, the electronic commerce application 115, and/or other applications that may track network page 118 views. The network page data 136 includes data that may be used in generating the network pages 118 that are sent to the clients 106. To this end, the network page data 136 may include templates, images, audio, video, animations, content, and/or any other data that may be used by the electronic commerce application 115 in generating network pages 118.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include a display 138. The display 138 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 139 and/or other applications. The browser 139 may be executed in a client 106, for example, to access and render network pages 118, such as web pages, or other network content served up by the computing device 103 and/or other servers. A rendered network page 140 may be displayed on the display 138. The client 106 may be configured to execute applications beyond browser 139 such as, for example, email applications, instant message applications, and/or other applications.

Confirmation display code 142 may be downloaded from the electronic commerce application 115 to the client 106 by way of the network page 118. The confirmation display code 142 is executed by the browser 139 in order to display confirmations of list modifications to the user in a display region 143 rendered on top of a rendered network page 140. The confirmation display code 142 may include any type of client-side code such as, for example, JavaScript, cascading style sheets, dynamic hypertext markup language (DHTML), Java, ActiveX, and/or any other type of code that may be used in controlling the rendering of display regions 143 with dynamic content on a rendered network page 140. In alternative embodiments, the rendering of display regions 143 may be controlled by the electronic commerce application 115.

Next, a general description of the operation of the various components of the networked environment 100 is provided. To begin, a user browses for items 121 on a network site served up by the electronic commerce application 115. The user may request one or more network pages 118 from the electronic commerce application 115. The network page 118 may comprise, for example, a detail network page 118 describing one or more items 121 in detail, a category network page 118 describing items 121 associated with a category, a search result network page 118 providing a list of items 121 resulting from a search query, and/or any other type of network page 118 that features one or more items 121. In one embodiment, the network page 118 includes confirmation display code 142 so as to facilitate the rendering of confirmations in display regions 143 on top of the rendered network page 140 if a user chooses to modify a list of items 121.

The user may modify one or more lists of items 121 by way of a component rendered in the network page 118 by the browser 139. As a non-limiting example, the network page 118 may describe an item 121 and include a component adjacent to the item 121 for requesting that the item 121 be added to a shopping cart, wish list, or some other list of items 121. Such a component may be any type of user interface component that may be included within a network page 118 such as, for example, buttons, checkboxes, hyperlinks, selectable images, and/or any other type of network page 118 component. When a user activates such a component, a request may be sent over the network 109 to the electronic commerce application 115.

Following the request, the electronic commerce application 115 may return data back to the client 106 including a confirmation as to whether the list modification was successful. As a non-limiting example, the confirmation may be rendered in a display region 143 as a layer superimposed on the rendered network page 140. The communication from the client 106 to the electronic commerce application 115 may be facilitated by the confirmation display code 142, which may, for example, use Ajax or another language. The confirmation display code 142 may be configured to render the display region 143.

It may be the case that the list modification may not be successful. As a non-limiting example, a user may request that a particular item 121 be added to a list of items 121. However, the electronic commerce application 115 may determine that the particular item 121 is already present within the list of items 121. In such a case, the electronic commerce application 115 may activate code within the network page 118 for rendering a preliminary display region 143 superimposed as a layer on the rendered network page 140. The preliminary display region 143 may be configured to obtain a user confirmation whether to proceed with adding the particular item 121 to the list of items 121. In other embodiments, the confirmation display code 142 may be configured to update elements within the rendered network page 140, play a sound, activate a dialog box, and/or take some other action to notify the user that the list modification was unsuccessful.

The display region 143 may be further configured to permit modifications of lists of items 121 to originate from within the display region 143. As a non-limiting example, the display region 143 may feature one or more items 121 that are related to the one or more items 121 that are the subject of the confirmation. These related items 121 may be presented in order to present upgrades, accessories, add-ons, service agreements, similar items 121, and other items 121 that the user may be interested in adding to the list of items 121. The related items 121 may be presented, for example, along with components for adding each respective item 121 to the list of items 121. Additionally, the related items 121 may include links to network pages 118 providing more detailed descriptions about the respective related items 121.

The display region 143 may include one or more undo components for requesting that a last modification to the list of items 121 be reversed. In one embodiment, the undo component may comprise a button, link, checkbox, and/or any other user interface component. When selected, the undo component may request that the entirety of the last modification to the list of items 121 be reversed. In another embodiment, the display region 143 may include one or more corresponding components for reversing a modification to each one of the items 121 in the list of items 121 that were modified in the previous action. For example, if a user requested that two different items 121 be added to a shopping cart, the display region 143 may include a remove component for each one of the two items 121.

When subsequent modifications are made to the list of items 121, the display region 143 may be updated to include new content. To this end, the confirmation display code 142 may include code for updating the display region 143 when a request to modify the list of items 121 is generated from within the display region 143. In one embodiment, the code for updating the display region 143 may be configured to visibly clear the display region 143 and subsequently render new content within the display region 143. As non-limiting examples, updating the display region 143 may include filling the display region 143 with a solid color such as white before rendering new content, fading from the previous content to the new content, and/or any other form of visible transition. Updated content may be rendered using, for example, highlighting, different colors, font weights, font sizes, etc.

Back and forward controls of the browser 139 may be configured to enable navigation between instances of modified content rendered within the display region 143. In other words, each instance of modified content within the display region 143 may appear to be a separate network page 118 as far as browser 139 history is concerned. However, the instances of modified content are rendered in the same display region 143 over the same network page 118, which may require special configuration of the browser 139 using the confirmation display code 142 to enable history-based navigation. As a non-limiting example, the browser 139 may have back and forward buttons that may be used to navigate serially between the network page 118 and the instances of modified content. As another non-limiting example, the browser 139 may have a history list enabling navigation to any one of the network page 118 and the instances of modified content.

In one embodiment, navigating to a different instance of modified content in the display region 143 may return the list of items 121 to a state consistent with the different instance of modified content. To facilitate such a change in state, the confirmation display code 142 may communicate with the electronic commerce application 115 when the navigation is initiated. In another embodiment, the different instance of modified content may be updated to be consistent with the current state of the list of items 121.

Figure 2:
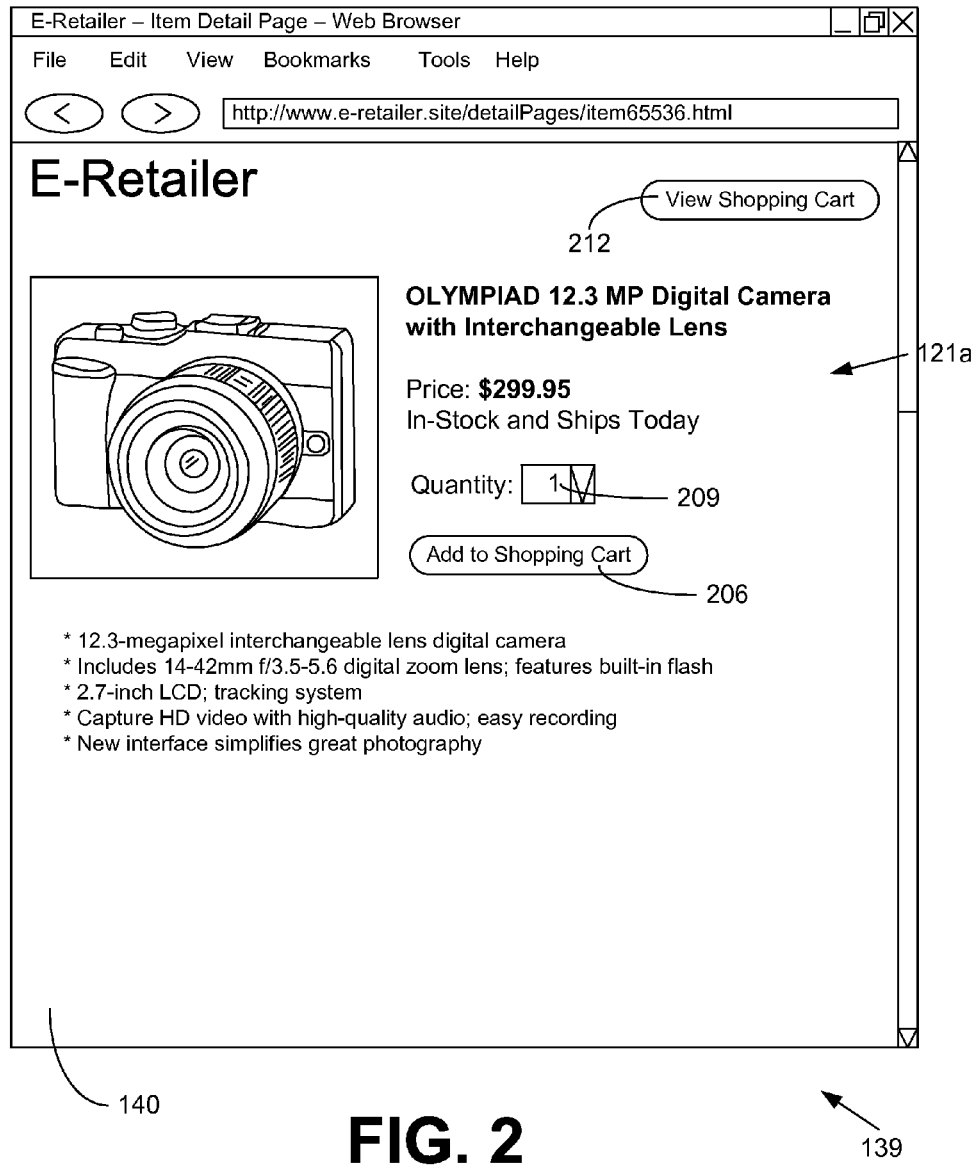
FIGS. 2-9 are drawings of examples of a rendered network page in a client in the networked environment of FIG. 1 according to various embodiments of the present disclosure.

Several examples of a rendered network page 140 according to embodiments of the present disclosure will now be described with reference to FIGS. 2-9. Beginning with FIG. 2, shown is one example of a rendered network page 140 in a browser 139 executed in a client 106 (FIG. 1) in the networked environment 100 (FIG. 1) according to an embodiment of the present disclosure. The rendered network page 140 displayed in FIG. 2 is an example of a detail page about one item 121a, comprising a camera. In addition to providing information about the item 121a, the rendered network page 140 includes a component 206 for adding the item 121a to the shopping cart of the user. It is understood that other types of lists of items 121 may be modified in other embodiments. The rendered network page 140 includes a quantity control 209 for specifying a particular quantity of the item 121a to be included within the shopping cart. The rendered network page 140 may also include a component 212 to enable the user to view the current contents of the shopping cart, for example, by navigating to another network page 118 (FIG. 1).

Figure 3:
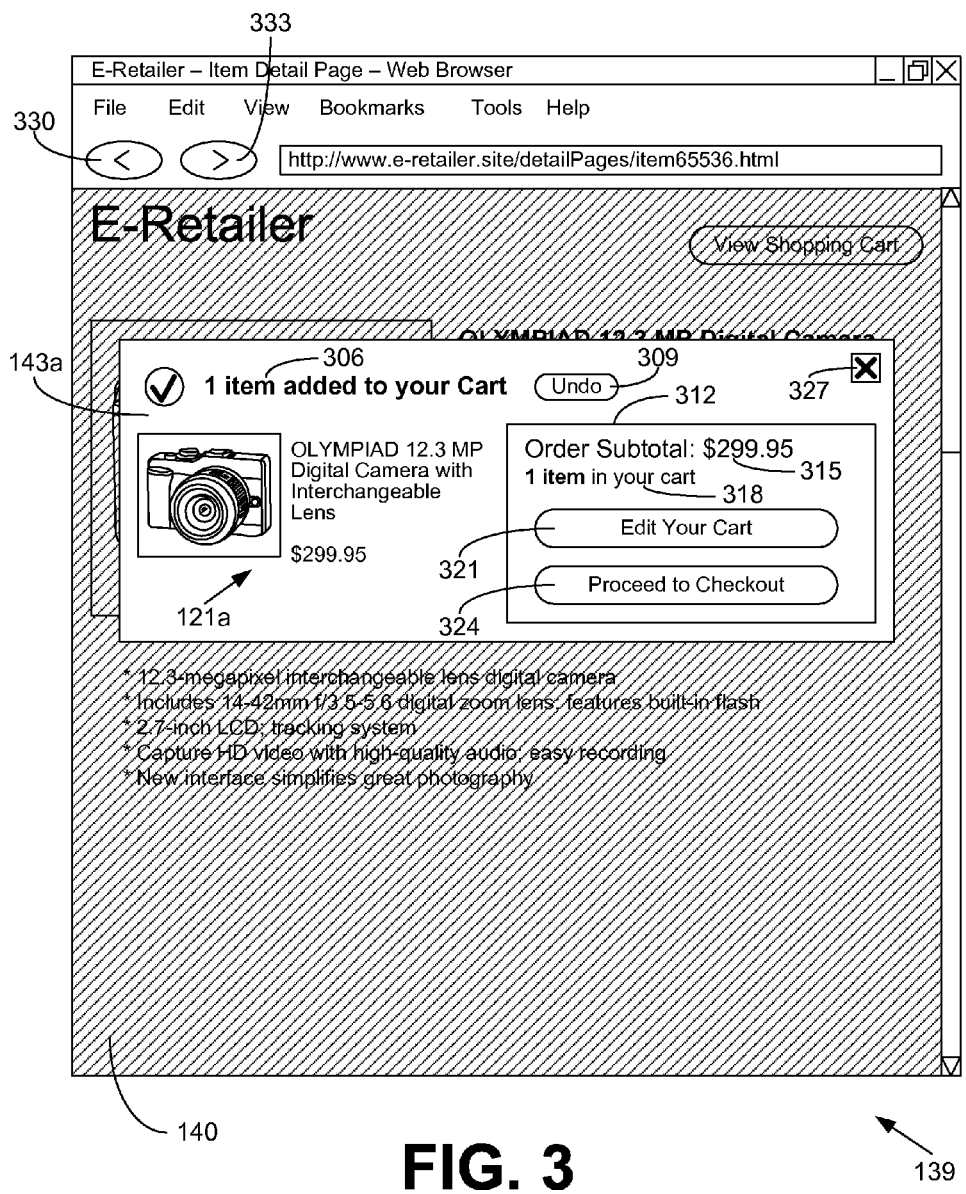

Moving on to FIG. 3, shown is another example of the rendered network page 140 in the browser 139 executed in the client 106 (FIG. 1) in the networked environment 100 (FIG. 1) according to an embodiment of the present disclosure. In FIG. 3, a display region 143a is rendered as a layer superimposed over the rendered network page 140 to provide a confirmation for adding the item 121a to the shopping cart. The display region 143a includes confirmation text 306, which may confirm to the user that a modification requested previously has been undertaken. In this illustration, the confirmation text 306 states "1 item added to your Cart." An image of a checkmark is included along with the confirmation text 306.

Different text and/or images may be presented by the confirmation text 306 in other embodiments. As a non-limiting example, the modification may be to a purchase list, whereby an order has been submitted for the item(s) 121a. In one embodiment, the purchase list may comprise a "single-click" purchase list, whereby the action of adding the item(s) 121a to the purchase list automatically results in the placing of an order for the item(s) 121a.

In addition, an undo component 309 may be included in the display region 143a for requesting that the previous modification be reversed. The undo component 309 is illustrated as a button, but could be any type of user interface component. If the undo component 309 is selected, a request may be sent to the electronic commerce application 115 (FIG. 1) for the item 121a to be removed from the shopping cart or other list. If the display region 143a featured a confirmation for adding, for example, three different items 121a to the shopping cart, selecting the undo component 309 may, for example, request that all three of the items 121a be removed from the shopping cart, thereby reversing the previous modification. Where the list of items 121 comprises a purchase list, selecting the undo component 309 may request that a corresponding order be canceled.

The display region 143a may include a summary region 312 providing various information about the shopping cart, wish list, or other list of items 121. In this example, the summary region 312 includes a price subtotal 315, a list summary 318, a component 321 for enabling further modification of the shopping cart, a component 324 for initiating a purchase associated with the list of items 121, and/or other information and components as desired.

The display region 143a may include a close button 327 for dismissing the display region 143a when selected. In other embodiments, the close button 327 may comprise a link or other user interface component as desired. In one embodiment, the portion of the rendered network page 140 that is not obscured by the display region 143a is shown as dimmed, shaded, or grayed out in FIG. 3. By dimming the non-obscured portion of the rendered network page 140, the attention of the user is drawn to the display region 143a. However, by preserving the non-obscured portion of the rendered network page 140 in the background, the context of the list modification is retained for the user. As shown in FIG. 3, the display region 143a is completely opaque and completely obscures the portion of the rendered network page 140 that is underneath. However, in another embodiment, the display region 143a may be partially opaque and permit at least some visibility of the obscured portion of the rendered network page 140 that is underneath. In one embodiment, the display region 143a may be dismissed or closed when the user selects a portion of the rendered network page 140 that is dimmed or otherwise not obscured by the display region 143a. Such a selection may be made, for example, by a single-click, double-click, right-click, a key press on a keyboard, and/or other forms of selection.

Other content may be included in the display region 143a as desired. As a non-limiting example, the display region 143a may include other promotional content such as related financial offers, advertisements, and so on. As another non-limiting example, the display region 143a may include a search tool to enable searching of a catalog of items 121. As yet another non-limiting example, the display region 143a may provide a delivery estimate and/or other information about shipping methods. In one embodiment, the display region 143a may include components to select a shipping method.

The browser 139 may include a back control 330 and a forward control 333. The back control 330 and forward control 333 may be used to navigate serially between network pages 118 (FIG. 1) in a history of the browser 139. In one embodiment, the back control 330 and the forward control 333 may be used to move between the rendered network page 140 as displayed in FIG. 2 and an instance of modified content rendered in the display region 143a. For example, when a user clicks on a button corresponding to a back control 330, the display region 143a may be dismissed. Likewise, when a user clicks on the forward control 333, the display region 143a may reappear. In other words, the display region 143a may be configured to function in a similar manner as a separate network page 118 for the purposes of the browser 139 history. The back control 330 and the forward control 333 may be accessible through a history menu of the browser 139 and may also be accessed by way of keyboard shortcuts.

Figure 4:
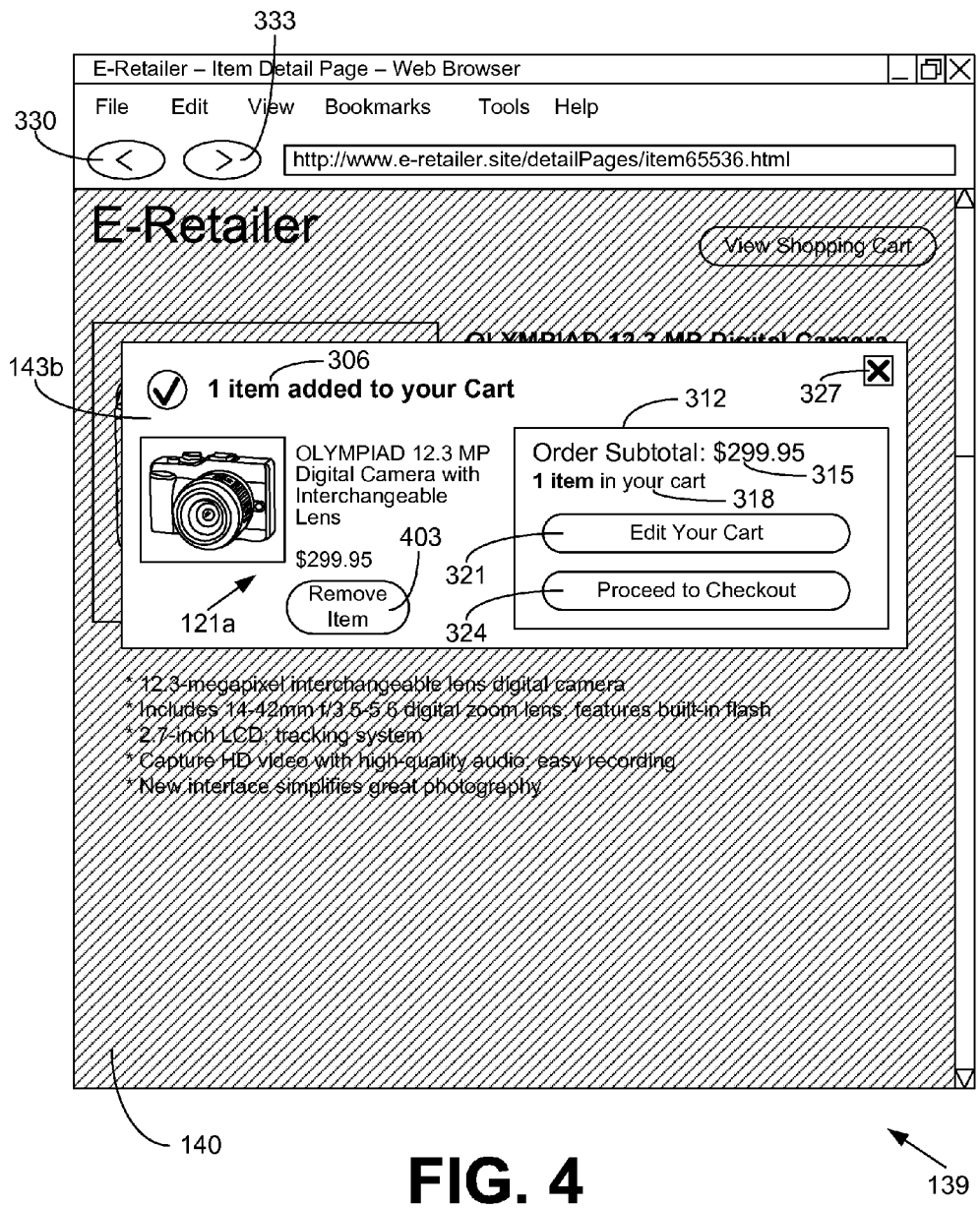

Referring next to FIG. 4, shown is another example of the rendered network page 140 in a browser 139 executed on a client 106 (FIG. 1) in the networked environment 100 (FIG. 1) according to an embodiment of the present disclosure. In FIG. 4, the undo component 309 (FIG. 3) is absent from the display region 143b and has been replaced by an undo component 403. Unlike the undo component 309, the undo component 403 may be associated with the specific item 121a. Accordingly, when the undo component 403 is selected, the item 121a is removed from the shopping cart, wish list, or other list. In other words, the modification to the list of items 121 respecting that item 121a is reversed. If multiple items 121 are displayed as modified within the display region 143b, multiple corresponding undo components 403 may be included. In another embodiment, the undo component 309 may be present along with the undo components 403 in order to reverse either an entire set of modifications or specific item 121a modifications. Although the undo component 403 is illustrated as a button having the text "Remove Item," it is understood that the undo component 403 may have other text and/or take the form of other user interface components in other embodiments.

Figure 5:
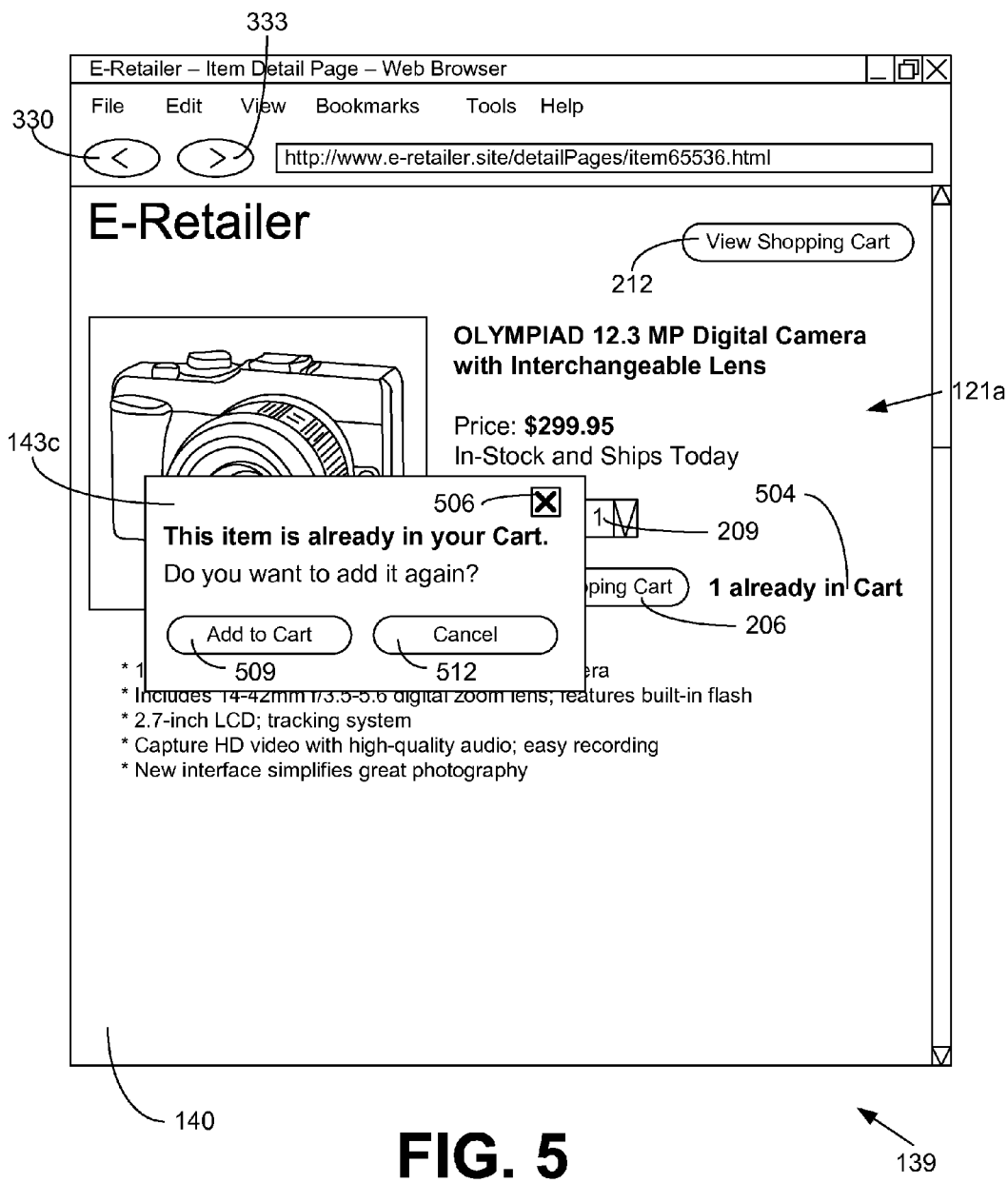

With reference to FIG. 5, shown is another example of the rendered network page 140 in the browser 139 executed in a client 106 (FIG. 1) in the networked environment 100 (FIG. 1) according to an embodiment of the present disclosure. In FIG. 5, a preliminary display region 143c is shown superimposed over the rendered network page 140. A user has selected the component 206 to request that the item 121a be added to the shopping cart, wish list, or other list. However, the item 121a currently exists in the shopping cart, wish list, or other list. That the item 121a currently exists in the list of items 121 may be represented on the rendered network page 140, for example, with item status text 504. As illustrated in this example, the item status text 504 states: "1 already in Cart."

A confirmation as to whether to proceed with adding the item 121a may be presented for the user in the preliminary display region 143c. The preliminary display region 143c may include, for example, a close button 506, a confirmation button 509, a cancel button 512, and/or other components. When the user selects the confirmation component 509, a request may be sent to the electronic commerce application 115 (FIG. 1) to proceed with the modification to the shopping cart, wish list, or other list. When the cancel component 512 is selected, the modification to the list of items 121 may be canceled. The modification may also be canceled when the close button 506 is selected, when a portion of the rendered network page 140 that is not obscured by the preliminary display region 143c is selected, and/or when some other action is taken.

The modification to the list of items 121 may include a modification to multiple items 121 in the list of items 121. Accordingly, it may be the case that only a subset of the items 121 requested to be added to the shopping cart, wish list, or other list are currently in the list. In such a case, the preliminary display region 143c may provide options for proceeding with the entire modification for all of the items 121, proceeding only with the modification to the items 121 not already present in the list of items 121, or canceling the modification.

As shown, the preliminary display region 143c is rendered adjacent to or near the component 206 that was used to initiate the request for the modification. In other embodiments, the preliminary display region 143c may be rendered in the center of the browser 139 viewport or at some other location. Compared with the display region 143a (FIG. 3), the preliminary display region 143c may occupy less screen space. Additionally, the portion of the rendered network page 140 that is not obscured by the preliminary display region 143c may not be dimmed, shaded, or grayed out. However, the non-obscured portion of the rendered network page 140 may be dimmed, shaded, or grayed out in other embodiments.

Figure 6:
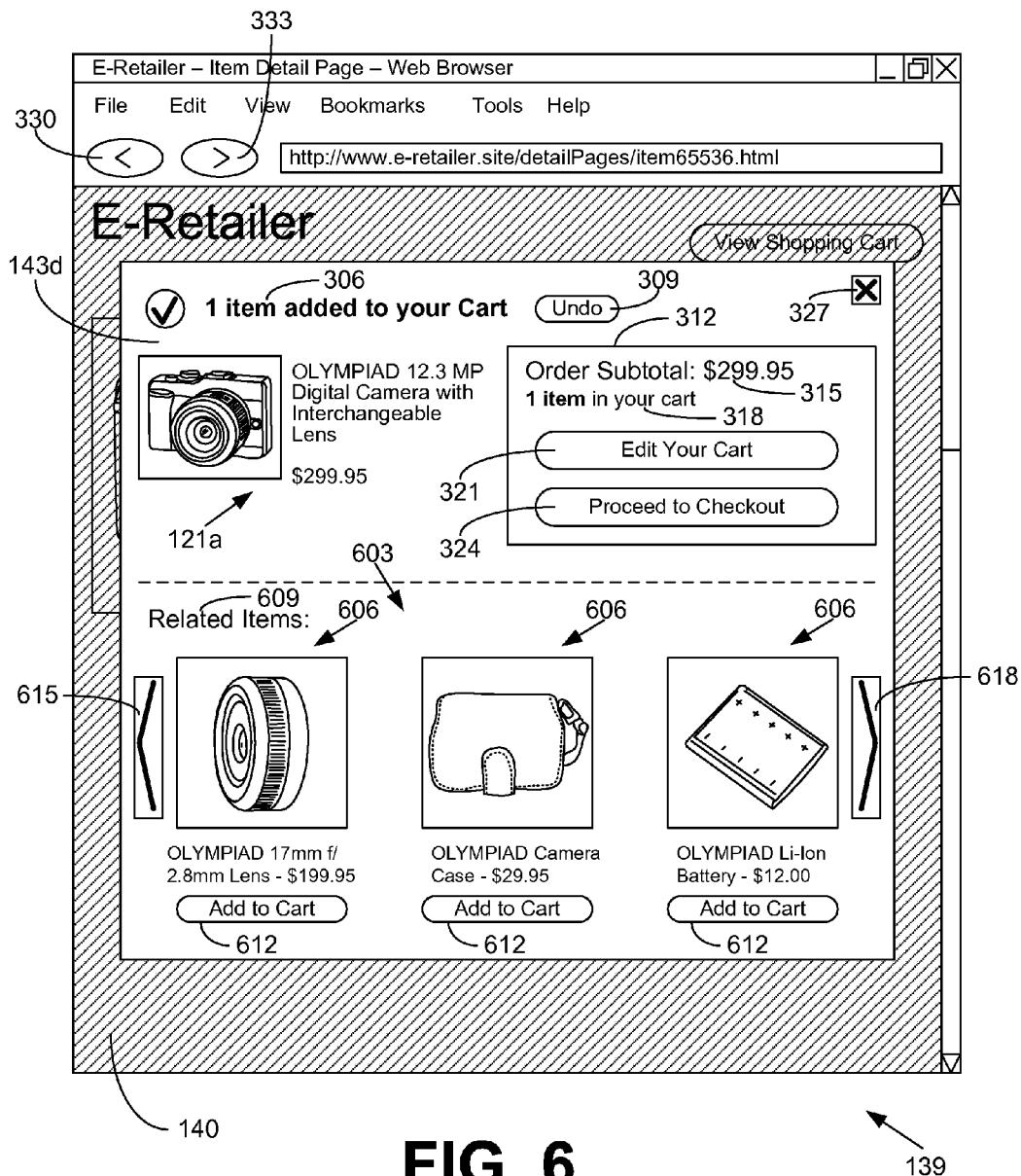

Turning now to FIG. 6, shown is another example of the rendered network page 140 in the browser 139 executed in the client 106 (FIG. 1) in the networked environment 100 (FIG. 1) according to an embodiment of the present disclosure. In FIG. 6, the display region 143d includes a featured items area 603 for displaying one or more featured items 606. A heading 609 identifies the featured items 606 as being "Related Items," or items 121 that are related to the item 121a being added to the shopping cart, wish list, or other list. As a non-limiting example, the featured items 606 may be items 121 that have been viewed and/or purchased by users who have also viewed and/or purchased the item 121a. Such featured items 606 may be determined by the electronic commerce application 115 (FIG. 1) examining the order data 130 (FIG. 1), the page view data 133 (FIG. 1), and/or other data. The featured items 606 may include accessory items 121, upgrade items 121, popular items 121, items 121 that are frequently bought together with the item 121a, and/or other items 121 as desired for merchandising purposes. The featured items area 603 may include components 612 for adding the respective featured items 606 to the shopping cart, wish list, or other list.

Although three featured items 606 are shown in FIG. 6, any number of featured items 606 may be displayed within the featured items area 603 depending on the space available in the display region 143d. To this end, the featured items area 603 may include controls 615, 618 for changing which ones of the featured items 606 are displayed, where only some of the featured items 606 may be displayed at one time in the featured items area 603. Further, the featured items area 603 may include a viewport with scrollbars to enable different featured items 606 to be displayed. In one embodiment, the data describing respective featured items 606 may be loaded asynchronously from the electronic commerce application 115 by the confirmation display code 142 (FIG. 1) when the respective featured items 606 are to be rendered in the featured items area 603.

Figure 7:
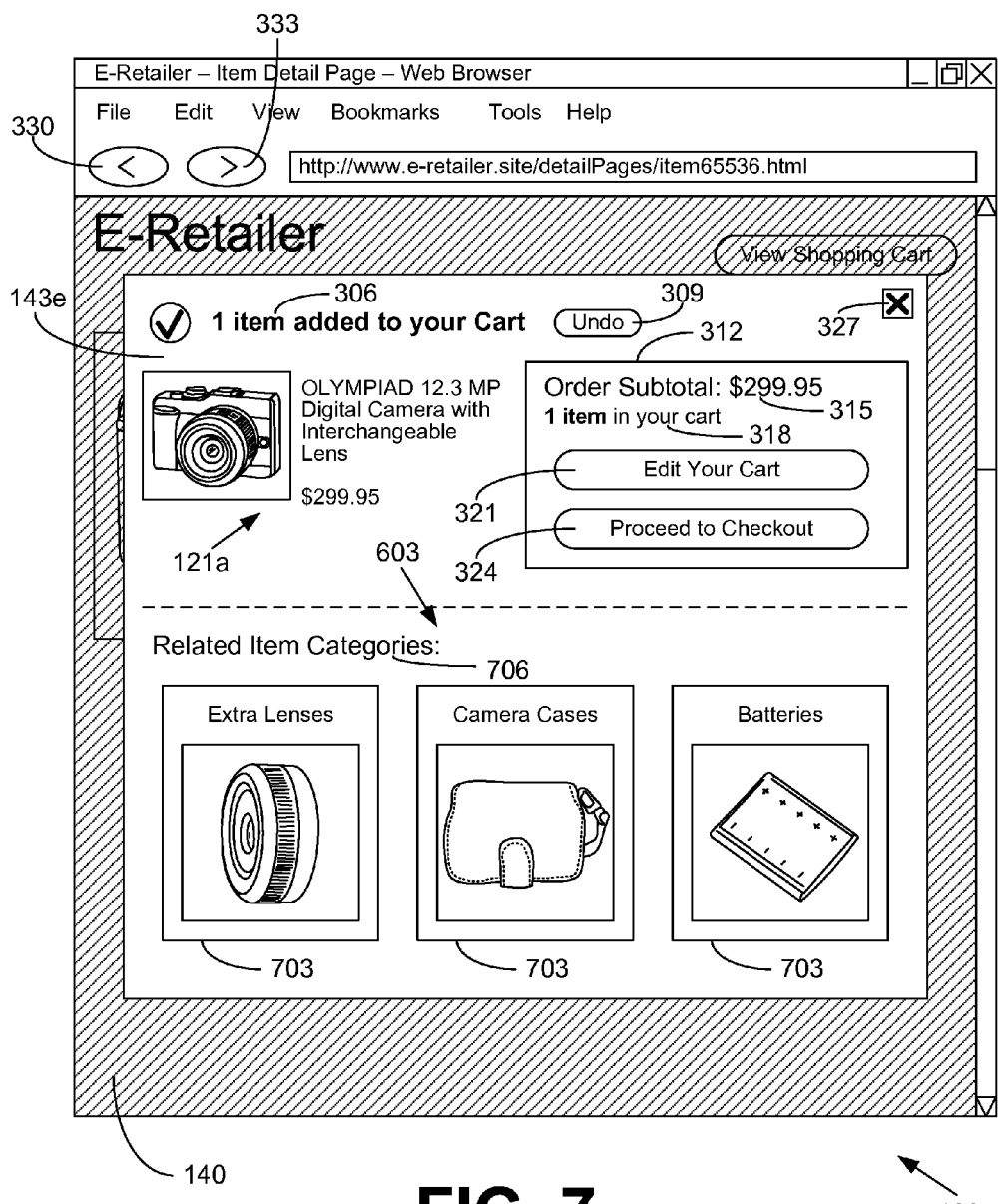

Referring next to FIG. 7, shown is another example of the rendered network page 140 in the browser 139 executed in the client 106 (FIG. 1) in the networked environment 100 (FIG. 1) according to an embodiment of the present disclosure. In FIG. 7, the featured items area 603 in the display region 143e displays a plurality of featured item categories 703, which are "Related Item Categories" as indicated by the heading 706. The featured item categories 703 are determined by the electronic commerce application 115 (FIG. 1), for example, to relate to the item 121a added to the shopping cart, wish list, or other list.

The featured item categories 703 may include categories of accessories that are relevant to the item 121a. For example, the featured item categories 703 may be determined by a percentage of users who select items 121 in a given featured item category 703 after buying, adding to a list, or otherwise selecting the item 121a. The featured item categories 703 therefore may be determined through the order data 130 (FIG. 1), the page view data 133 (FIG. 1), and/or other data. The percentages of users selecting the items 121 may be shown in conjunction with the featured item category 703. As a non-limiting example, for a featured item category 703 of camera cases, the featured item category 703 may state "23% of customers also purchased camera cases."

Particular items 121, such as representative items 121, frequently ordered items 121, frequently viewed items 121, items 121 related to the item 121a, etc., associated with the respective featured item categories 706 may be showcased. The featured item categories 703 may be configured to launch browsing of items 121 within the display region 143e or may be configured to load another network page 118 (FIG. 1) in the main window of the browser 139 for the browsing of items 121.

Figure 8:
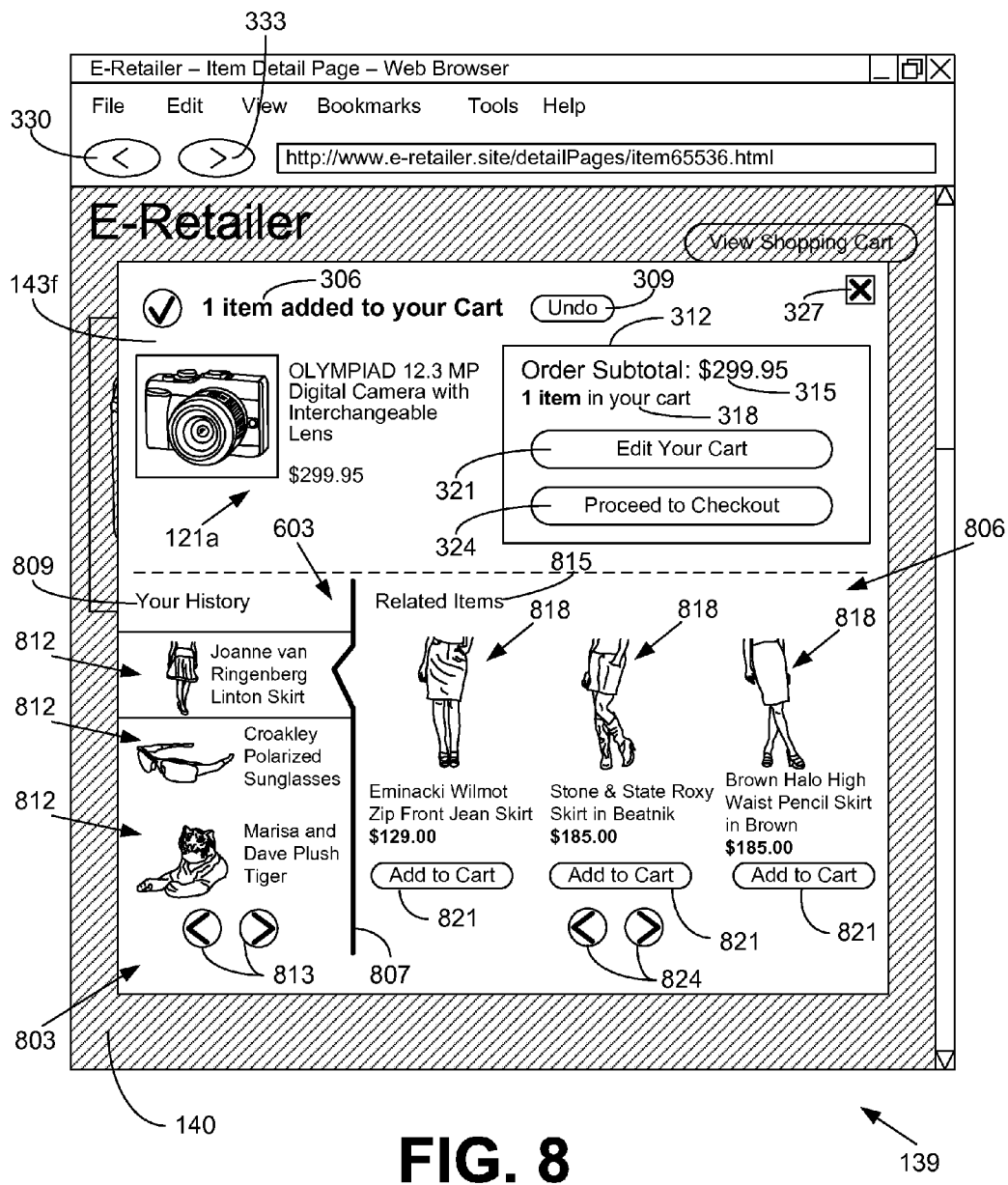

Moving on to FIG. 8, shown is another example of the rendered network page 140 in a browser 139 executed on a client 106 (FIG. 1) in the networked environment 100 (FIG. 1) according to an embodiment of the present disclosure. In FIG. 8, the featured items area 603 in display region 143f includes a previously selected items area 803 and a related items area 806. The previously selected items area 803 may be visually separated from the related items area 806 with a separator 807. In one embodiment, the separator 807 may enable the user to allocate screen space within the featured items area 603, for example, to the previously selected items area 803 or to the related items area 806.

The previously selected items area 803 includes a heading 809, which in this case reads "Your History." The previously selected items area 803 displays one or more previously selected items 812 that were previously selected by the user. For example, the previously selected items 812 may have been previously viewed, ordered, or otherwise selected by the user as determined from the user history data 127 (FIG. 1).

Three previously selected items 812 are displayed in the previously selected items area 803. The previously selected items 812 are selectable and may include links to cause loading of detail network pages 118 (FIG. 1) regarding the respective previously selected item(s) 812. One or more navigational controls 813 may be provided to navigate among the previously selected items 812 in the previously selected items area 803. For example, it may be the case that not all of the previously selected items 812 may be displayed at once in the previously selected items area 803. The navigational controls 813 may permit other previously selected items 812 to be shown within the same area. In one embodiment, the previously selected items area 803 may comprise a viewport with one or more scrollbars to view other previously selected items 812 that cannot fit within the viewable portion of the previously selected items area 803. The confirmation display code 142 (FIG. 1) may be configured to retrieve data from the electronic commerce application 115 (FIG. 1) regarding previously selected items 812 when needed to populate the previously selected items area 803.

In one embodiment, the previously selected items 812 may be ordered chronologically according to when they were respectively selected. However, other sequences may be used, including sequences based, for example, on which of the previously selected items 812 are more relevant to the item 121a. In FIG. 8, the topmost previously selected item 812 has been selected and has been used to populate the related items area 806. In one embodiment, the topmost previously selected item 812 may be selected by default, although other previously selected items 812 may be selected by default. The separator 807 may be configured to indicate which of the previously selected items 812 is currently selected.

The related items area 806 includes a heading 815, which, in this example, reads "Related Items." Three related items 818 are displayed in the related items area 806, although any number of related items 818 may be displayed in the related items area 806 space permitting. Each of the related items 818 includes a respective component 821 for adding the corresponding related item 818 to the shopping cart or other list of items 121. Additionally, links and/or other components may enable loading of detail network pages 118 regarding the respective related items 818. One or more navigational controls 824 may be used to display other related items 818 which are not currently visible within the related items area 806. In one embodiment, the related items area 806 may include a viewport and one or more scrollbars for viewing other related items 818 in the related items area 806. The data describing the related items 818 may be loaded, for example, on demand by the confirmation display code 142 from the electronic commerce application 115 when a related item 818 is selected or when other related items 818 are to be shown in the related items area 806.

In another embodiment, navigation among sets of related items 818 may be similarly provided for featured item categories 703 (FIG. 7). As a non-limiting example, each one of the items 812 may correspond to a respective featured item category 703. The related items 818 corresponding to the item 812 may then comprise items 121 classified as within the respective featured item category 703.

Figure 9:
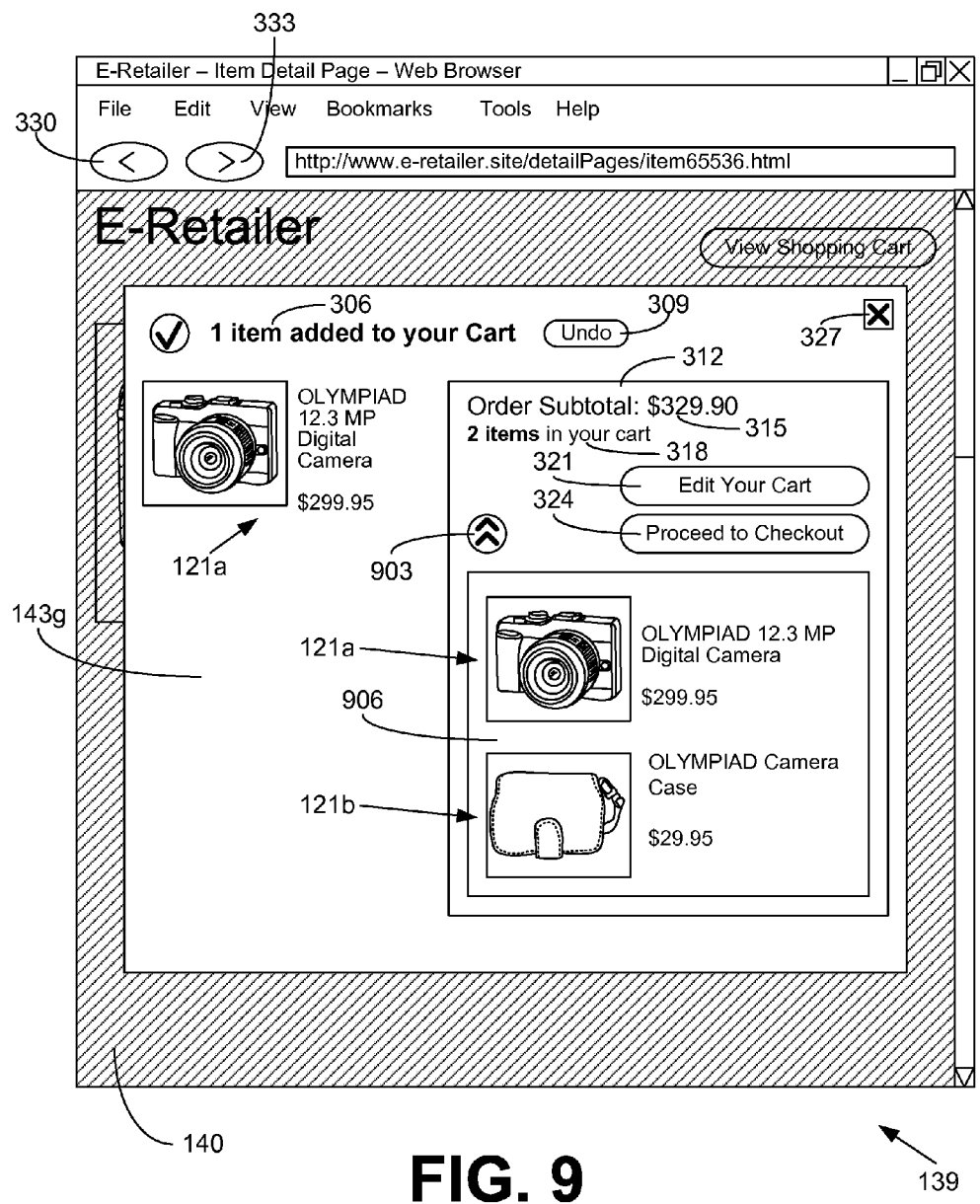

With reference to FIG. 9, shown is another example of the rendered network page 140 in a browser 139 executed in a client 106 (FIG. 1) in the networked environment 100 (FIG. 1) according to an embodiment of the present disclosure. In FIG. 9, the summary region 312 in the display region 143g includes a component 903 for enabling the display of an item list region 906. The component 903 may be, for example, a toggle button, a link, a checkbox, or some other user interface component. The item list region 906 may be configured to display all of the items 121 currently in a shopping cart or other list of items 121 of the user. In the example of FIG. 9, another item 121b is shown in the list of items 121 other than the newly added item 121a. Accordingly, the price subtotal 315 and the list summary 318 differ from that shown in FIG. 3.

The item list region 906 may include different information and provide different functionality in various embodiments. In one embodiment, the item list region 906 may simply provide a listing of the items 121 in the list of the user. In another embodiment, the item list region 906 may enable editing functionality, for example, to remove particular items 121, change the quantities of items 121, change shipping options, specify a priority for an item 121 in a wish list or gift registry, specify a delivery frequency in a shopping list, move an item 121 to a different list, and so on. In one embodiment, the display region 143g may be configured to expand when the item list region 906 is enabled. In another embodiment, the item list region 906 may be superimposed over other content in the display region 143g and/or the rendered network page 140.

Figure 10:
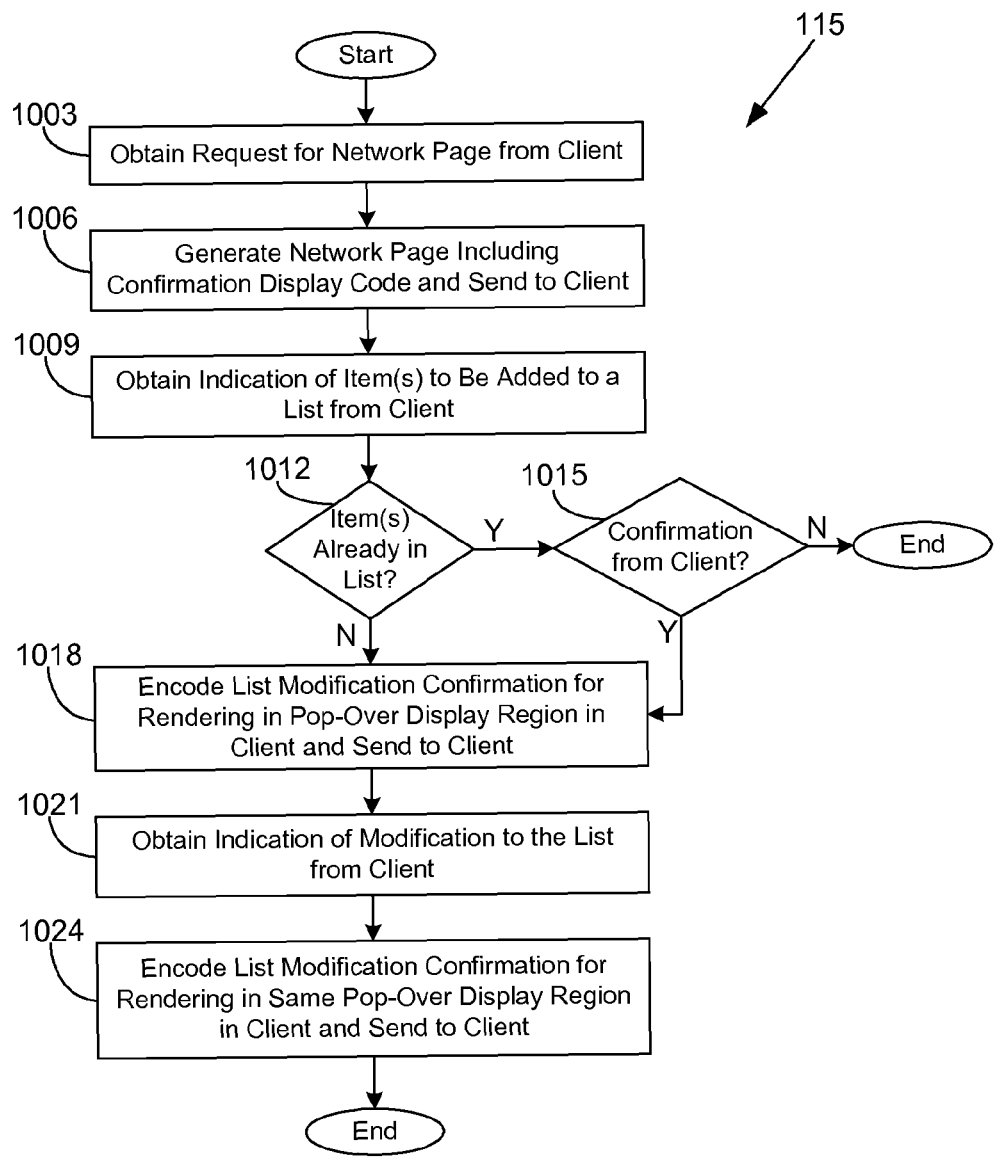
FIG. 10 is a flowchart illustrating one example of functionality implemented as portions of an electronic commerce application executed in a computing device in the networked environment of FIG. 1 according to various embodiments of the present disclosure.

Referring next to FIG. 10, shown is a flowchart that provides one example of the operation of a portion of the electronic commerce application 115 according to various embodiments. It is understood that the flowchart of FIG. 10 provides merely an example of the many different types of functional arrangements that may be employed to implement the operation of the portion of the electronic commerce application 115 as described herein. As an alternative, the flowchart of FIG. 10 may be viewed as depicting an example method implemented in the computing device 103 (FIG. 1) according to one or more embodiments.

Beginning with box 1003, a request for a network page 118 (FIG. 1) is obtained from a client 106 (FIG. 1). As non-limiting examples, the request may be for a detail network page 118, a search results network page 118, a home network page 118, or some other type of network page 118. In box 1006, the electronic commerce application 115 generates the network page 118 including the confirmation display code 142 (FIG. 1) and then sends the network page 118 to the client 106. The network page 118 may include one or more components for requesting that one or more items 121 (FIG. 1) be added to a list of items 121. The confirmation display code 142 may facilitate rendering of a display region 143 (FIG. 1) as a layer superimposed on the rendered network page 140 (FIG. 1) when appropriate.

In box 1009, the electronic commerce application 115 obtains an indication of item(s) 121 that are to be added to a list of items 121 from the client 106. This indication may be obtained asynchronously with respect to the original request for the network page 118. As a non-limiting example, a user may view the rendered network page 140 and, after deliberating for some time, decide to add the item 121 to a shopping cart, wish list, or other list.

Next, in box 1012, the electronic commerce application 115 determines whether the items 121 are currently within the list of items 121. If the items 121 are currently in the list of items 121, the electronic commerce application 115 proceeds to box 1015 and obtains confirmation from the client 106 to proceed. For example, the electronic commerce application 115 may cause a preliminary display region 143c (FIG. 5) to be rendered in the browser 139 (FIG. 1). If the user elects not to proceed with adding the item 121 or items 121 to the list of items 121, the portion of the electronic commerce application 115 ends. Otherwise, the electronic commerce application 115 obtains the confirmation from the client 106 and proceeds to box 1018. If the electronic commerce application 115 determines in box 1012 that the items 121 are not currently in the list of items 121, the electronic commerce application 115 also proceeds to box 1018.

In box 1018, the electronic commerce application 115 encodes a list modification confirmation for rendering in a pop-over display region 143 in the client 106 and sends the list modification confirmation to the client 106. The encoded list modification confirmation may be obtained by the confirmation display code 142 and rendered in the browser 139. The display region 143 may be configured to obscure a portion of the rendered network page 140. The display region 143 may include one or more components for initiating a purchase associated with the list of items 121, one or more undo components for requesting that the last modification to the list of items 121 be reversed, and/or other components.

In box 1021, the electronic commerce application 115 may obtain an indication of a modification to the list of items 121 from the client 106. Such an indication may be provided asynchronously with respect to box 1018. For example, the user may view the confirmation and related items 121 displayed in the display region 143 and decide to add one of the related items 121 to the list of items 121. Subsequently, in box 1024, the electronic commerce application 115 encodes the list modification confirmation for rendering in the same pop-over display region 143 in the client 106 and sends the data to the client 106. Accordingly, the content displayed in the display region 143 is modified. Thereafter, the portion of the electronic commerce application 115 ends.

Figure 11:
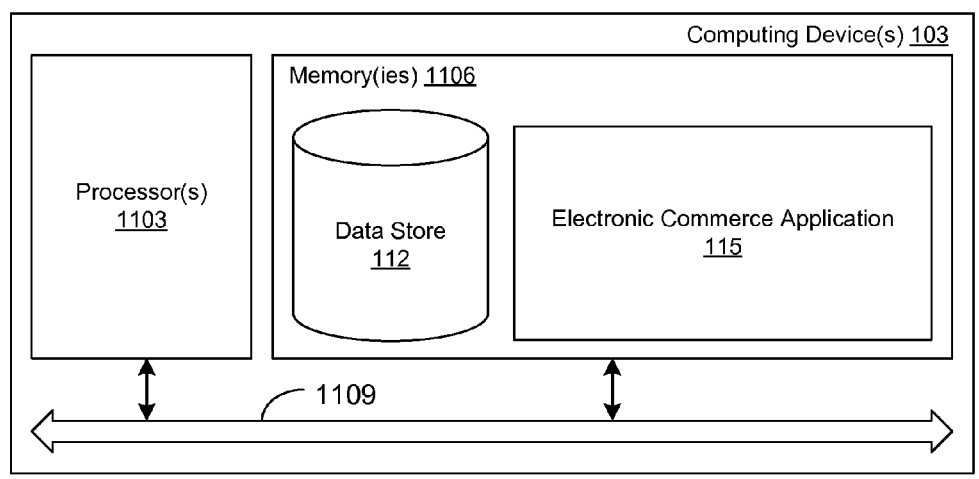
FIG. 11 is a schematic block diagram that provides one example illustration of a computing device employed in the networked environment of FIG. 1 according to various embodiments of the present disclosure.

With reference to FIG. 11, shown is a schematic block diagram of the computing device 103 according to an embodiment of the present disclosure. The computing device 103 includes at least one processor circuit, for example, having a processor 1103 and a memory 1106, both of which are coupled to a local interface 1109. To this end, the computing device 103 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the electronic commerce application 115, and potentially other applications. Also stored in the memory 1106 may be a data store 112 and other data. In addition, an operating system may be stored in the memory 1106 and executable by the processor 1103.

It is understood that there may be other applications that are stored in the memory 1106 and are executable by the processors 1103 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and the memory 1106 may represent multiple memories 1106 that operate in parallel processing circuits, respectively. In such a case, the local interface 1109 may be an appropriate network 109 (FIG. 1) that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the electronic commerce application 115, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 10 shows the functionality and operation of an implementation of portions of the electronic commerce application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. Further, various blocks shown in FIG. 10 may be omitted in other embodiments. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that sends a network page to a client, the network page including at least one component for requesting that at least one product be added to a shopping list;
   code that adds the at least one product to the shopping list in response to a request from the client;
   code that encodes a preliminary display region for rendering in the client as a layer superimposed on the network page when at least one of the at least one product is currently in the shopping list, and the preliminary display region is configured to obtain a user confirmation whether to proceed with adding the at least one product to the shopping list;
   code that encodes a display region for rendering in the client as a layer superimposed on the network page and obscuring a portion of the network page, a remaining portion of the network page being dimmed, the display region including a confirmation that the at least one product has been added to the shopping list, the display region including at least one undo component for requesting that a last modification to the shopping list be reversed; and code that configures a forward browser control and a back browser control to navigate serially between the network page and a plurality of instances of modified content rendered within the display region, at least some of the instances of modified content corresponding to a response to a respective request to modify the shopping list.

2. A system, comprising:

at least one computing device; and an electronic commerce application executable in the at least one computing device, the electronic commerce application comprising:

logic that sends a network page to a client, the network page including at least one component for requesting that at least one item be added to a list of items;

logic that adds the at least one item to the list of items in response to a request from the client; and logic that encodes a display region for rendering in the client as a layer superimposed on the network page, the display region including a confirmation that the at least one item has been added to the list of items, the display region including at least one undo component for requesting that a last modification to the list of items be reversed;

wherein the network page includes code for rendering a preliminary display region superimposed as a layer on the network page when at least one of the at least one item is currently in the list of items, and the preliminary display region is configured to obtain a user confirmation whether to proceed with adding the at least one item to the list of items.

3. The system of claim 2, wherein the display region is configured to obscure a portion of the network page.

4. The system of claim 2, wherein the display region includes a component for initiating a purchase associated with the list of items.

5. The system of claim 2, wherein the electronic commerce application further comprises logic that identifies a plurality of item categories that are related to the at least one item, and wherein the display region includes an item categories area for displaying the item categories.

6. The system of claim 2, wherein the display region includes a featured items area for displaying at least one featured item, and the featured items area includes at least one corresponding component for requesting that each one of at least one featured item be added to the list of items.

7. The system of claim 6, wherein the at least one featured item comprises a plurality of featured items, the featured items area displays some of the featured items, and the featured items area includes at least one control for changing which ones of the featured items are displayed.

8. The system of claim 7, wherein the electronic commerce application further comprises logic that identifies a plurality of item categories that are related to the at least one item, and wherein the featured items are organized according to the item categories.

9. The system of claim 6, wherein the electronic commerce application further comprises logic that identifies a plurality of related items that are related to the at least one item, and wherein the at least one featured item comprises the related items.

10. The system of claim 6, wherein the electronic commerce application further comprises logic that identifies a plurality of related items that are related to one of a plurality of items that were previously selected by a user, and wherein the at least one featured item comprises the related items.

11. The system of claim 10, wherein the one of the items is selectable from the items that were previously selected by the user by at least one component included in the display region.

12. The system of claim 2, wherein the network page includes code for obtaining data for rendering the display region from the at least one computing device after initially rendering the network page.

13. The system of claim 2, wherein the network page includes code for updating the display region when a request to modify the list of items is generated from within the display region.

14. The system of claim 13, wherein the updating of the display region includes visibly clearing the display region and subsequently rendering new content within the display region.

15. The system of claim 2, wherein the network page includes code for rendering an indication in the network page that the at least one item is in the list of items when the display region is dismissed.

16. The system of claim 2, wherein the network page is configured to be dimmed when the display region is visible.

17. The system of claim 2, wherein the display region is configured to be dismissed when a visible portion of the network page is selected.

18. The system of claim 2, wherein the at least one undo component comprises at least one corresponding component for removing each one of the at least one item from the list of items.

19. The system of claim 2, wherein the list of items is selected from the group consisting of: a shopping cart, a shopping list, a purchase list, a gift registry, and a wish list.

20. The system of claim 2, wherein the display region includes at least one component for requesting modification of at least one attribute associated with at least one of the at least one item.

21. The system of claim 2, wherein the display region includes a subtotal price associated with the list of items.

22. The system of claim 2, wherein the display region includes a quantity of items in the list of items.

23. The system of claim 2, wherein the display region includes an area for displaying the list of items.

24. The system of claim 23, wherein the area for displaying the list of items is configured to be rendered in response to a selection of a component of the display region.

25. A method, comprising:

sending, via at least one of one or more computing devices, a network page to a client, the network page including at least one component for requesting that at least one item be added to a list of items;

determining, via at least one of the one or more computing devices, that at least one of the at least one item is currently in the list of items before adding the at least one item to the list of items;

encoding, via at least one of the one or more computing devices, a preliminary display region for rendering in the client as a layer superimposed on the network page, the preliminary display region being configured to obtain a user confirmation whether to proceed with adding the at least one item to the list of items;

adding, via at least one of the one or more computing devices, the at least one item to the list of items in response to obtaining the user confirmation; and encoding, via at least one of the one or more computing devices, a display region for rendering in the client as a layer superimposed on the network page, the display region including a confirmation that the at least one item has been added to the list of items;

wherein the network page includes code that configures a forward browser control and a back browser control to navigate serially between the network page and a plurality of instances of modified content rendered within the display region.

26. The method of claim 25, wherein the display region is configured to obscure a portion of the network page, and wherein the display region is configured to be dismissed when a non-obscured portion of the network page is selected.

27. The method of claim 25, wherein the network page is configured to visibly clear the display region when navigating between the instances of modified content.

28. The method of claim 25, further comprising:

identifying, via at least one of the one or more computing devices, a plurality of related items that are related to at least one of the at least one item;

wherein the display region includes a related items area for displaying the related items, and the related items area includes at least one corresponding component for requesting that each one of the related items be added to the list of items.

* * * * *